(12) United States Patent
Bryan et al.

(10) Patent No.: US 10,657,045 B2
(45) Date of Patent: *May 19, 2020

(54) APPARATUS, SYSTEM, AND METHOD FOR MAINTAINING A CONTEXT STACK

(71) Applicant: International Business Machines Corporation, Armonk, NY (US)

(72) Inventors: Lourie A. Bryan, Tucson, AZ (US); Gregory T. Kishi, Oro Valley, AZ (US); Kerri R. Shotwell, Tucson, AZ (US); Joseph M. Swingler, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 15/801,196

(22) Filed: Nov. 1, 2017

(65) Prior Publication Data

US 2018/0052769 A1    Feb. 22, 2018

Related U.S. Application Data

(63) Continuation of application No. 14/535,069, filed on Nov. 6, 2014, which is a continuation of application
(Continued)

(51) Int. Cl.
*G06F 7/00* (2006.01)
*G06F 12/02* (2006.01)
(Continued)

(52) U.S. Cl.
CPC ........ *G06F 12/0253* (2013.01); *G06F 3/0619* (2013.01); *G06F 3/0656* (2013.01);
(Continued)

(58) Field of Classification Search
CPC .................................................. G06F 17/30958
See application file for complete search history.

(56) References Cited

U.S. PATENT DOCUMENTS

| | | | |
|---|---|---|---|
| 7,093,265 B1 * | 8/2006 | Jantz ..................... | G06F 13/385 709/230 |
| 7,610,451 B2 * | 10/2009 | Wolrich ................ | G06F 9/3851 711/148 |

(Continued)

OTHER PUBLICATIONS

Marty Humphrey et al., Alternative Software Stacks for OGSA-based Grids, Proceedings of the 2005 ACM/IEEE SC/05 Conference.

(Continued)

*Primary Examiner* — Alexandria Y Bromell
(74) *Attorney, Agent, or Firm* — Kunzler Bean & Adamson, PC

(57) ABSTRACT

For maintaining a context stack, a processor monitors a stack size for a stack of a plurality of existing contexts that are not associated to a process of a plurality of processes. Each context is associable and reusable with a plurality of processes and includes a pathway to a data set when not associated to any process of the plurality of processes. The pathway includes a logical volume identifier for the data set, a logical address of the data set within the logical volume, and a logical address of an intervening device. The context defines communications between the process and the data set through the pathway when associated to the process, and each context is returned to the stack when not associated to the process.

20 Claims, 9 Drawing Sheets

Related U.S. Application Data

No. 12/349,975, filed on Jan. 7, 2009, now Pat. No. 8,914,417.

(51) Int. Cl.
*G06F 9/50* (2006.01)
*G06F 3/06* (2006.01)

(52) U.S. Cl.
CPC .......... *G06F 3/0665* (2013.01); *G06F 3/0689* (2013.01); *G06F 9/5016* (2013.01); *G06F 9/5033* (2013.01); *G06F 2209/5011* (2013.01); *G06F 2212/702* (2013.01)

(56) References Cited

U.S. PATENT DOCUMENTS

| | | | | |
|---|---|---|---|---|
| 8,015,279 | B2* | 9/2011 | Christodoulou | H04L 43/12 370/216 |
| 9,063,892 | B1* | 6/2015 | Taylor | G06F 11/1446 707/707 |
| 9,075,755 | B1* | 7/2015 | Haase | G06F 11/1456 707/707 |
| 2005/0091412 | A1 | 4/2005 | Pinkerton et al. | |
| 2006/0041938 | A1* | 2/2006 | Ali | G06Q 20/341 726/14 |
| 2006/0041948 | A1 | 2/2006 | Allen | |
| 2006/0059496 | A1 | 3/2006 | Joy et al. | |
| 2006/0069871 | A1 | 3/2006 | Gill et al. | |
| 2006/0259487 | A1 | 11/2006 | Havens et al. | |
| 2007/0083813 | A1* | 4/2007 | Lui | G06F 11/3612 715/709 |
| 2007/0101091 | A1 | 5/2007 | Kaakani et al. | |
| 2007/0179828 | A1 | 8/2007 | Elkin et al. | |
| 2008/0046462 | A1 | 2/2008 | Kaufman et al. | |
| 2009/0168797 | A1 | 7/2009 | Danielson et al. | |
| 2009/0307377 | A1* | 12/2009 | Anderson | G06F 9/5016 710/3 |
| 2009/0307461 | A1* | 12/2009 | Nevarez | G06F 12/023 711/203 |
| 2009/0313026 | A1 | 12/2009 | Coffman et al. | |
| 2010/0153606 | A1 | 6/2010 | Cottrell | |

OTHER PUBLICATIONS

Michael R. Head et al, Benchmarking XML Processors for Applications in Grid Web Services, ACM Digital Library, Nov. 2006.

\* cited by examiner

205

APPARATUS, SYSTEM, AND METHOD FOR MAINTAINING A CONTEXT STACK

CROSS-REFERENCE TO RELATED APPLICATIONS

This is a continuation application of and claims priority to U.S. patent application Ser. No. 14/535,069 975 entitled "APPARAUTS, SYSTEM, AND METHOD FOR MAINTINGING A CONTEXT STACK" and filed Nov. 6, 2014 for Lourie A. Bryan, which is incorporated herein by reference, which claims priority to U.S. patent application Ser. No. 12/349,975 entitled "APPARAUTS, SYSTEM, AND METHOD FOR MAINTINGING A CONTEXT STACK" and filed on Jan. 7, 2009 for Lourie A. Bryan, which is incorporated herein by reference.

BACKGROUND

Field

This invention relates to stacks and more particularly relates to maintaining a context stack.

Description of the Related Art

Data sets are often used to store important personal and enterprise data. A data set may be accessed in a multi-threaded environment. In the multi-threaded environment, a single process may have multiple connections to a data set.

A process may connect to a data set using a context. As used herein a context is a data structure storing information defining communications with the data set. A process may call a Structured Query Language (SQL) function to create and attach to a context. Thereafter, the process may use the context to communicate with the data set.

Creating a context may require system significant resources. For example, a context creation function may find available memory, allocate memory, store data structures to the memory, and the like. As a result, contexts are often reused to avoid the cost of creating new contexts.

Contexts may be reused by creating a stack of contexts. A process that needs a context may retrieve an available context from the stack. When the process no longer needs the context, the process may return the context to the stack.

Unfortunately, if a large number of contexts are stored in a stack, significant resources are also used. For example, maintaining enough contexts on the stack that a context is always available may consume in excess of memory resources. However, if too few contexts are stored in the stack, significant resources are expended creating new contexts when additional numbers of contexts are acquired. For example, if too few contexts are maintained on the stack, the SQL function may be frequently employed to create additional contexts, which also consumes excess processing and memory resources.

SUMMARY

From the foregoing discussion, there is a need for an apparatus, system, and method that maintains a context stack. Beneficially, such an apparatus, system, and method would reduce system resources required to both maintain the context stack and create new contexts.

The present invention has been developed in response to the present state of the art, and in particular, in response to the problems and needs in the art that have not yet been fully solved by currently available context stack maintenance methods. Accordingly, the present invention has been developed to provide an apparatus, system, and method for maintaining a context stack that overcome many or all of the above-discussed shortcomings in the art.

The apparatus to maintain a context stack is provided with a plurality of modules configured to functionally execute the steps of monitoring a stack size and deallocating a context. These modules in the described embodiments include a monitor module and the stack module.

The monitor module monitors a stack size after each monitor interval for a stack of a plurality of contexts. Each context defines communications between a process and a data set and comprises a pathway for communicating with the data set and a process identifier. The stack module deallocates a context that satisfies a stack policy from the stack if the stack size is within a buffer threshold of a maximum threshold.

A system of the present invention is also presented to maintain a context stack. The system may be embodied in a data processing system. In particular, the system, in one embodiment, includes a plurality of storage devices, a plurality of contexts, and a server.

The plurality of storage devices store a data set. The plurality of contexts each define communications with the data set. Each context comprises a path for communicating between a process and the data set and the process identifier. The server is in communication with the storage devices. The server includes a stack of contexts, a monitor module, and a stack module.

The monitor module monitors a stack size for the stack after each monitor interval. The monitor interval is in the range of one hundred to two hundred seconds. Each context defines communications between a process and a data set and comprises a pathway for communicating with the data set and a process identifier. The stack module deallocates a context that satisfies a stack policy from the stack if the stack size is within a buffer threshold of a maximum threshold.

A method of the present invention is also presented for maintaining a context stack. The method in the disclosed embodiments substantially includes the steps to carry out the functions presented above with respect to the operation of the described apparatus and system. In one embodiment, the method includes monitoring a stack size and deallocating a context.

A monitor module monitors a stack size after each monitor interval for a stack of a plurality of contexts. Each context defines communications between a process and a data set and comprises a pathway for communicating with the data set and a process identifier. A stack module deallocates a context that satisfies a stack policy from the stack if the stack size is within a buffer threshold of a maximum threshold.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention maintains a context stack by monitoring a stack size and deallocating a context that satisfies a stack policy. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, data set queries, data set structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
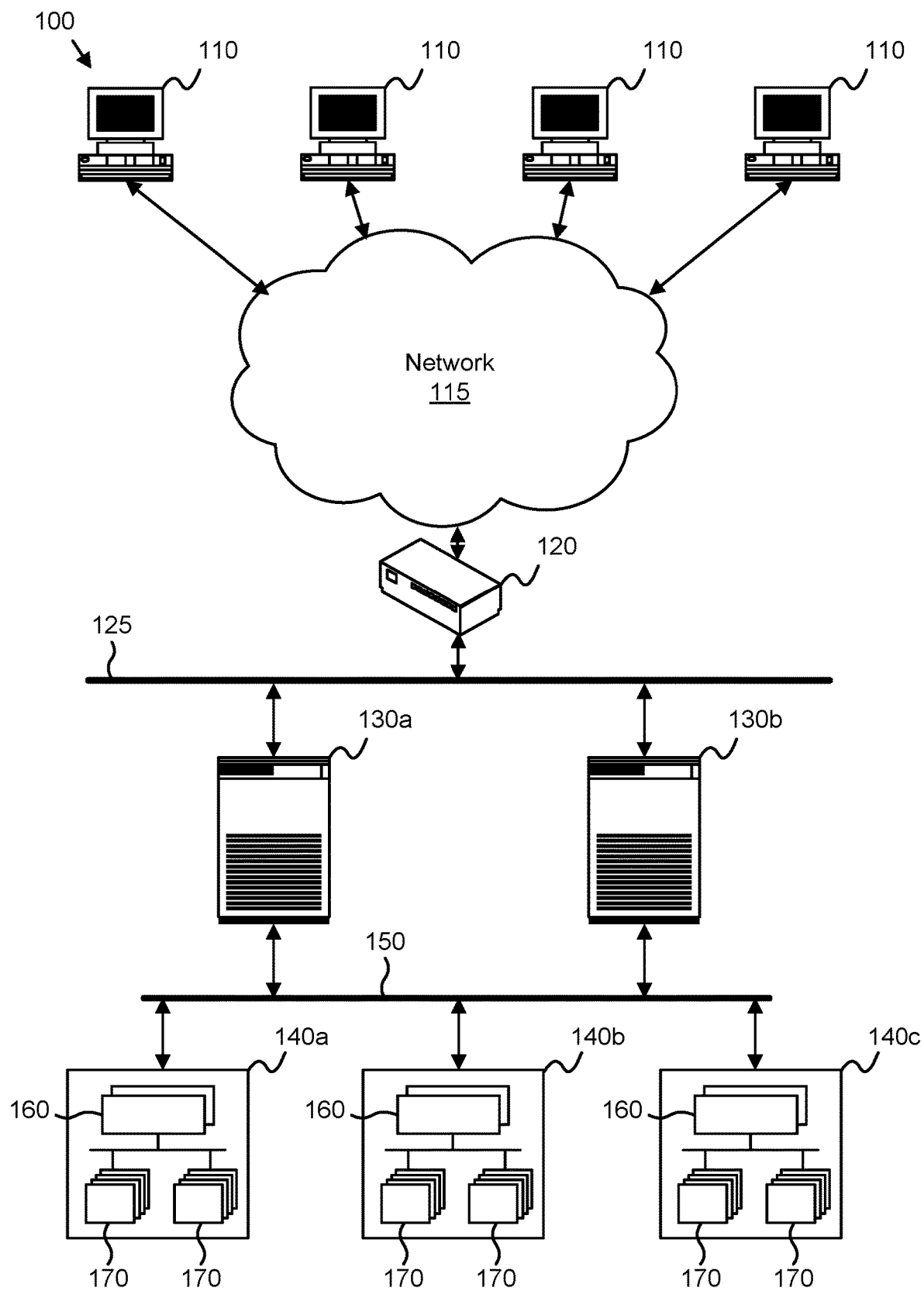
FIG. 1 is a schematic block diagram illustrating one embodiment of a data processing system in accordance with the present invention.

FIG. 1 is a schematic block diagram illustrating one embodiment of a data processing system in accordance with the present invention. The DPS 100 includes one or more client computers 110, a network 115, a router 120, an internal network 125, one or more servers 130, a storage communications channel 150, and one or more storage sub systems 140.

As used herein, the client computers 110 are referred to as clients 110. The clients 110 and servers 130 may also be configured as mainframe computers, blade centers comprising multiple blade servers, and the like. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices. Alternatively, the storage device 170 may also be configured as a just a bunch of disks (JBOD), a redundant array of independent disks (RAID), a tape library, a tape backup, an automated tape library, a compact disk read only memory (CD ROM) library, and the like.

In one embodiment, the DPS 100 provides data storage and data manipulation services for the clients 110. For example, a client 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the client 110.

The network 115 connecting the clients 110 and the servers 130 may be selected from a local area network (LAN), a wide area network (WAN), the Internet, an Ethernet network, a token ring network, or the like. The network 115 may comprise one or more nodes that may provide one or more physical and/or logical paths for transferring the data. The internal network 125 and the storage communications channel 150 may be for example a LAN, a WAN, or the like.

The storage devices 170 may store one or more data sets. A data set may be organized as a database. Each database may include one or more tables, processes, and the like. The clients 110 may access the data sets, retrieving data from the data sets storing data to the data sets.

In one embodiment, the clients 110 employ a database application to access the data sets. For example, a database application may employ one or more processes to access the data sets. A process may access a database a plurality of times. Each process may create a context to facilitate communication with a data set.

Context may require significant resources to create. As a result, after a context is created and no longer needed by a first process, the context may be reused by a second process. The second process may use the allocated memory space and data structure of the existing context. In addition, the second process may overwrite one or more data structures corresponding to the second process and the data set with which the second process is communicating.

The DPS 100 may maintain one or more stacks of contexts. A process that needs to communicate with the data set may retrieve a context from a stack. By using an existing context from the stack, the process avoids the overhead of creating the context. When the process is done using the context, the process may return the context to the stack so that the context may be reused.

Storing a large number of contexts in the stack may consume significant DPS 100 resources. As a result, it is not advantageous to store too many contexts in the stack. Similarly, if too few contexts are available from the stack, significant DPS resources may be consumed creating additional contexts when the additional contexts are needed. The present invention maintains a context stack, deallocating contexts from the stack when appropriate as will be explained hereafter.

Figure 2:
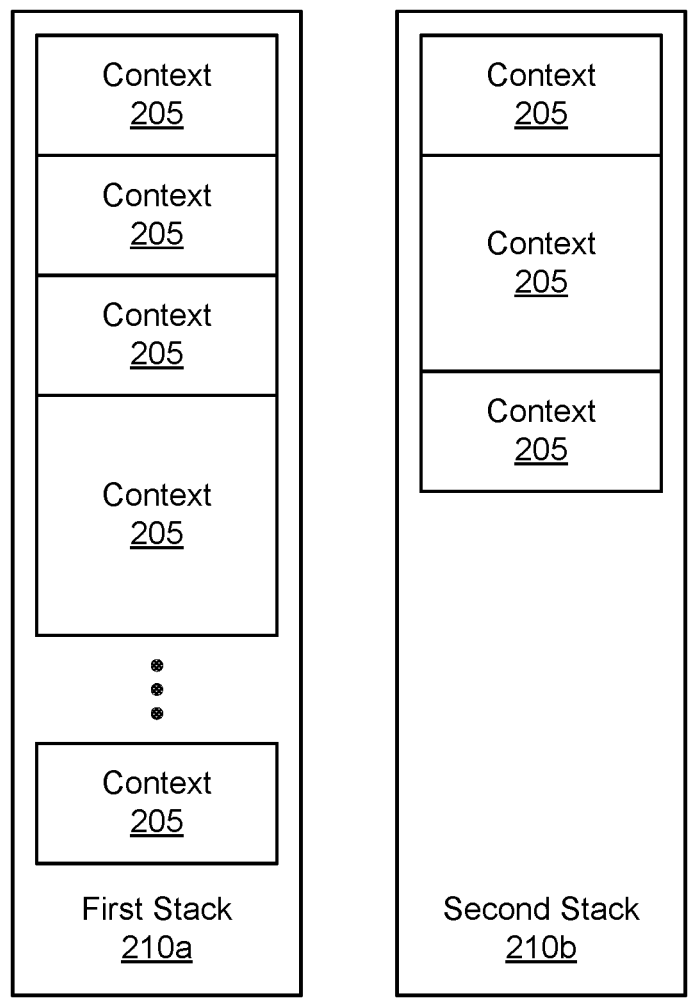
FIG. 2 is a schematic block diagram illustrating one embodiment of context stacks of the present invention.

FIG. 2 is a schematic block diagram illustrating one embodiment of context stacks 210 of the present invention. The description of the stacks 210 refers to elements of FIG. 1, like numbers referring to like elements. The stacks 210 includes a first stack 210a and a second stack 210b. However one of skill the art will recognize that the present invention may be practiced with any number of stacks 210.

The stacks 210 may be created by a data processing device such as the servers 130 and/or the clients 110 of FIG. 1. Each stack 210 stores one or more contexts 205. In one embodiment, each stack 210 comprises a linked list of data structures stored in a memory device such as a semiconductor memory device, a hard disk memory device, and the like. Each data structure may include a pointer to a preceding data structure and the succeeding data structure. Each data structure may further comprise a context 205. Alternatively, each data structure may comprise a pointer to a context 205.

Each stack 210 may further comprise a stack pointer to a data structure on a top of the stack 210 as is well known to those of skill in the art. When a context 205 is retrieved from the stack 210 for use by a process, an address of the context 205 of the top data structure referenced by the stack pointer may be communicated to the process. The process may then use the context 205 by referencing the address.

The stack pointer may then be set to a preceding data structure. The top data structure may store the address of the preceding data structure. The preceding data structure then becomes the top data structure.

In one embodiment, each context 205 as a variable size. For example, a first context 205 may occupy 4 MB of data storage while a second context 205 may occupy 8 MB of data storage. In an alternate embodiment, each context 205 may have a fixed size. For example, each context 205 may occupy 2 MB of data storage.

If no contexts 205 are available in a stack 210, one or more processes may create additional contexts 205. For example, a process may employ an SQL command to create and connect to a context 205. However, if too many contexts 205 are stored in the stack 210, the stack may consume excess DPS 100 resources. The present invention maintains the stacks 210 by deallocating excess contexts 205 as will be described hereafter.

Figure 3:
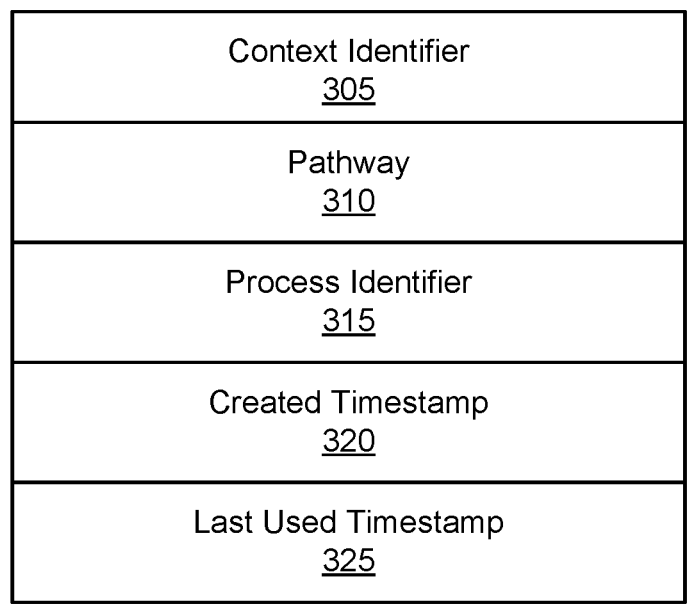
FIG. 3 is a schematic block diagram illustrating one embodiment of a context of the present invention.

FIG. 3 is a schematic block diagram illustrating one embodiment of a context 205 of the present invention. The context 205 may be the context 205 of FIG. 2. The description of the context 205 refers to elements of FIGS. 1-2, like numbers referring to like elements. The context 205 includes a context identifier 305, a pathway 310, a process identifier 315, a created time stamp 320, and a last used time stamp 325. One of skill in the art will recognize that the context 205 may include additional data fields.

In one embodiment, the context identifier 305 identifies the context 205. The context identifier 305 may be used by a process to connect to the context 205. For example, a process of a database application may issue commands to a data set by communicating the commands appended to the context identifier 305 in a data packet.

The pathway 310 may describe a logical location of a data set. In one embodiment, the pathway 310 comprises a logical volume identifier for a data set and a logical address of the data set within the logical volume. In a certain embodiment, the pathway 310 further includes the logical addresses of one or more intervening devices. For example, the pathway 310 may include the logical address of the connection manager, a bridge, a router, ports, and the like.

The process identifier 315 may identify the process that is associated with the context 205. For example, if the first process retrieves a context 205 from the stack 210, the first process may write a process identifier for the first process to the process identifier 315 of the context 205. In one embodiment, the process identifier 315 is used to route communications from a data set to a process. For example, a database application receiving a communication from a data set through a context 205 may route the communication to the process specified by the process identifier 315.

In one embodiment, the created time stamp 320 stores in a data value indicating a date and time when the context 205 is created. Similarly, the last used time stamp 325 may store a data value indicating a date and a time when the context 205 is last employed by a process.

Figure 4:
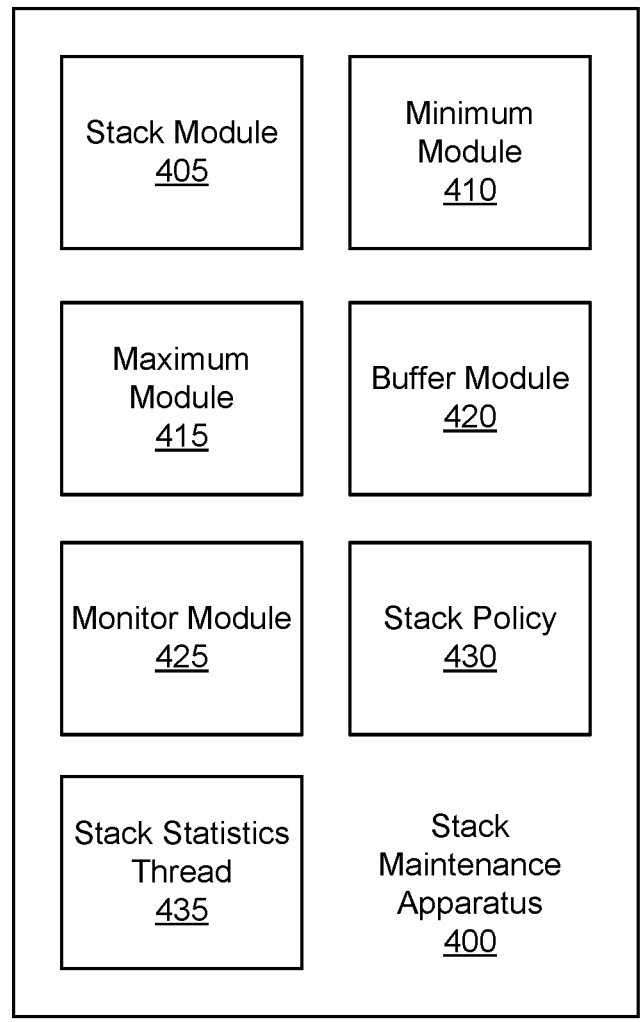
FIG. 4 is a schematic block diagram illustrating one embodiment of a stack maintenance apparatus of the present invention.

FIG. 4 is a schematic block diagram illustrating one embodiment of a stack maintenance apparatus 400 of the present invention. The description of the apparatus 400 refers to elements of FIGS. 1-3, like numbers referring to like elements. The apparatus 400 may be embodied in a data processing device such as a server 130, a storage controller 160, a client 110, or the like. The apparatus includes a stack module 405, a minimum module 410, a maximum module 415, a buffer module 420, a monitor module 425, a stack policy 430, and a stack statistics thread 435.

In one embodiment, the stack module 405, the minimum module 410, the maximum module 415, the buffer module 420, the monitor module 425, the stack policy 430, and the stack statistics thread each comprises a computer program product. The computer program product may have a computer readable program stored on a tangible storage device. The tangible storage device may be a semiconductor memory device. Alternatively, the tangible storage device may be a hard disk drive, and optical storage device, or the like. The computer readable program may be executed by a computer such as a storage controller 160, a server 130, and/or a client 110.

The minimum module 410 may establish a minimum threshold. In one embodiment, the minimum threshold is a minimum number of contexts 205 in the stack 210. For example, the minimum module 410 may establish a minimum threshold of 100 contexts 205 in the stack 210.

The minimum module 410 may establish the minimum threshold to a value wherein contexts 205 are created no more than once within a specified time interval. For example, the minimum module 410 may set the minimum threshold to 125 contexts 205 if the minimum threshold value of 125 contexts 205 results in the creation of contexts 205 only once within a one hour time interval. In one embodiment, the minimum module 410 maintains a log of DPS activity and the use of contexts 205. The minimum module 410 may adjust the minimum threshold in response to a change in DPS activity.

In one embodiment, an administrator sets the minimum threshold. The minimum threshold may be stored in a configuration file. Changes to the minimum threshold may also be stored in the configuration file.

The maximum module 415 may establish a maximum threshold of contexts 205 allocated to the stack 210. For example, the maximum module 415 may establish a maximum threshold of 1200 contexts 205 in the stack 210. In one embodiment, an administrator sets the maximum threshold. Alternatively, the maximum threshold may be stored in a configuration file.

In a certain embodiment, the maximum threshold is established as a percentage of available data storage. For example, the maximum threshold may be a number of contexts 205 that may be stored in 1% of a memory device. The maximum module 415 may maintain a log of DPS activity and context usage. In addition, the maximum module 415 may adjust the maximum threshold in response to changes in DPS activity, changes in these contexts 205, and the like.

The buffer module 420 may establish a buffer threshold. In one embodiment, the buffer module is in the range of 1 to 20% of the maximum threshold. In a certain embodiment, the buffer threshold is in the range of 5 to 15% of the maximum threshold. The buffer module 420 may receive the buffer threshold from an administrator. In addition, the buffer threshold 420 may be stored in the configuration file.

In one embodiment, the buffer module 420 maintains a log of DPS activity and the use of contexts 205. The log may also include information on context creation and overall DPS resource usage. The buffer module 420 may adjust the buffer threshold in response to changes in DPS activity, changes in the use of contexts 205, and changes in DPS resource usage.

The stack policy 430 may comprise one or more rules for deallocating a context 205 from the stack 210. A context 205 that satisfies the stack policy may be a candidate for deallocation. In one embodiment, the administrator specifies the stack policy 430. The stack policy 430 may be stored in the configuration file.

In one embodiment, the stack policy 430 is satisfied if a retention interval is expired after creation of the context 205. The retention interval may be in the range of one to 24 hours. In a certain embodiment, the retention interval is in the range of 100 to 500 seconds. If the created time stamp 320 of the context 205 indicates that the context 205 was created before the retention interval, the stack policy 430 may be satisfied.

In an alternate embodiment, the stack policy 430 is satisfied for a specified context 205 if the specified context 205 has a largest memory use of the plurality of contexts 205 in the stack 210. For example, if the specified context uses 32 MB of data storage and no other contexts 205 uses more than 32 MB of data storage, the specified context 205 may satisfy the stack policy 430.

In one embodiment, a specified context 205 satisfies the stack policy 430 if the specified context 205 is an earliest created of the plurality of contexts 205 in the stack 210. In a prophetic example, the created time stamp 320 for the specified context 205 may indicate that a specified context was created 16 hours earlier. The specified context 205 may satisfy the stack policy 430 if no other context 205 was created more than 16 hours earlier.

A specified context 205 may satisfy the stack policy 430 if the specified context 205 is a least recently used context 205 of the plurality of contexts 205 in the stack 210. In one embodiment, the last used time stamp 325 is used to determine the least recently used context 205. In a prophetic example, the specified context 205 may satisfy the stack policy 430 if the specified context 205 was used 900 seconds earlier, and no other contexts 205 were last used more than 900 seconds earlier.

In one embodiment, the stack module 405 creates one or more stacks 210. In addition, the stack module 405 may include the stack pointer and manage the stack 210. For example, a process may communicate with the stack module 405 to retrieve a context 205 from the stack 210. Similarly, the process may communicate with the stack module 405 to return the context 205 to the stack 210. The stack module 405 deallocates a context 205 that satisfies the stack policy 430 from the stack 210 if the stack size is within the buffer threshold of the maximum threshold as will be explained hereafter.

The monitor module 425 monitors a stack size after each monitor interval for a stack of a plurality of contexts allocated to a process. Each context defines communications with a data set and comprises a pathway for communicating with the data set and a process identifier. The monitor interval may be in the range of 50 to 600 seconds. In a certain embodiment, the monitor interval is in the range of 100 to 200 seconds.

In a certain embodiment, the monitor interval is calculated using Equation one, where m is the monitor interval, k is a constant and v is a volume of transactions for a specified process.

$$m = (100)k/v \qquad \text{Equation 1}$$

In one embodiment, the monitor module 425 collect statistics on each stack 210. The monitor module 425 may employ the stack statistics thread 435 to collect the stack statistics. The stack statistics thread 435 may be inactive for the monitor interval. Upon the expiration of the monitor interval, the stack statistics thread may activate and determine the stack size for one or more stacks 210. After determining the stack size, the stack statistics thread 435 may return to inactivity.

The apparatus 400 maintains the stack 210 by monitoring the stack size and deallocating a context 205 that satisfies the stacks policy 430 when the stack size is within the buffer threshold of the maximum threshold. By deallocating the context 205, the apparatus 400 prevents the stack 210 from consuming excessive DPS resources.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
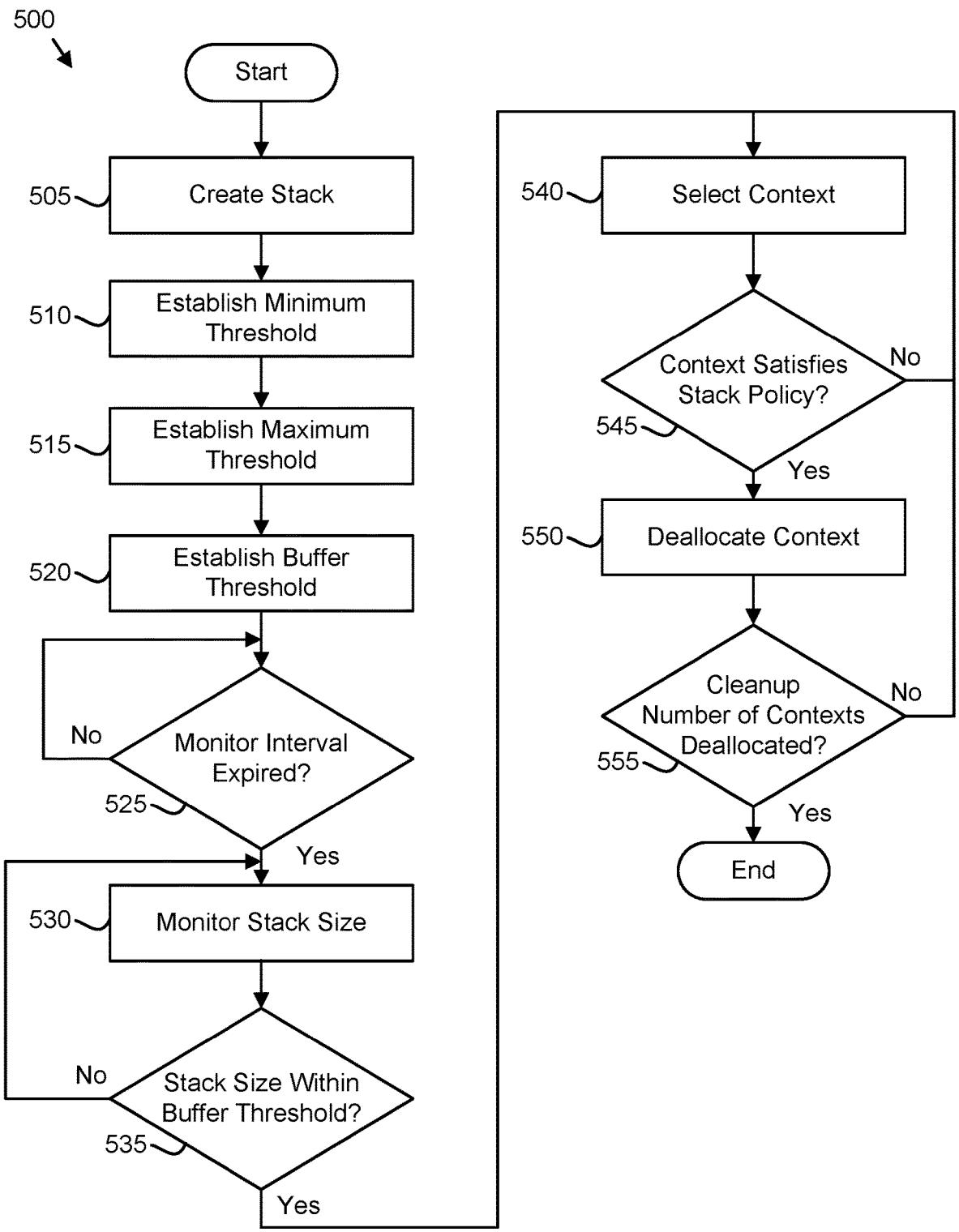
FIG. 5 is a schematic flow chart diagram illustrating one embodiment of a stack maintenance method of the present invention.

FIG. 5 is a schematic flow chart diagram illustrating one embodiment of a stack maintenance method of the present invention. The method 500 substantially includes the steps to carry out the functions presented above with respect to the operation of the described apparatus 400 and system 100 of FIGS. 4 and 1 respectively. In one embodiment, the method 500 is implemented with a computer program product comprising a computer readable program stored on a tangible storage device. The computer readable program may be integrated into a computer, such as the storage controller 160, the server 130, and the client 110, wherein the program when executed on the computer performs the method 500.

The method 500 begins, and in one embodiment, the stack module 405 creates 505 the stack 210. The stack module 405 may create 505 the stack 210 by allocating memory space for stack data structures and by creating the stack pointer.

The minimum module 410 may establish 510 the minimum threshold. In one embodiment, the minimum threshold is in the range of 10 to 500 contexts 205. In a certain embodiment, the minimum threshold is in the range of 25 to 200 contexts 205.

In one embodiment, the maximum module 415 establishes 515 the maximum threshold. The maximum module 415 may calculate the maximum threshold for a first stack 210 using Equation 2, where is the maximum threshold, p is a constant, n is a number of the plurality of contexts 205 in the stack 210, $v_1$ is a volume of transactions for the first process, and $v_i$ is a volume of transactions for each $i^{th}$ process of a plurality of processes.

$$t_{max} = \frac{pv_1}{\sum_{i=1}^{n} v_i}$$ Equation 2

The maximum threshold may be in the range of 800 to 10,000 contexts 205. In a certain embodiment, the maximum threshold is in the range of 1,000 to 5,000 contexts 205.

In one embodiment, the buffer module 420 establishes 520 the buffer threshold. The buffer threshold may be a function of overall DPS resource usage. In a certain embodiment, Equation 3 calculates the buffer threshold, where $t_b$ is the buffer threshold, b is a constant, and r is the overall DPS resource usage.

$$t_b = br$$ Equation 3

The monitor module 425 determines 525 if the monitor interval is expired. If the monitor interval is not expired, the monitor module 425 continues to determine 525 if the monitor interval is expired. If the monitor interval is expired, the monitor module 425 monitors 530 a stack size for one or more stacks 210. In one embodiment, the monitor module 425 traverses and counts the linked data structures in each stack 210. Alternatively, the monitor module 425 retrieves a stack size count from the stack 210.

The stack module 405 determines 535 if the stack size is within the buffer threshold of the maximum threshold. For example, if maximum threshold is 1,000 contexts 205, the buffer threshold is 15% of the maximum threshold or 150 contexts 205, and the stack size is within 5% of the maximum threshold or 950 contexts 205, the stack module 405 may determine 535 that the stack size is within the buffer threshold of the maximum threshold. If the stack size is not within the buffer threshold of the maximum threshold, the monitor module 425 may determine 525 if the monitor interval has again expired.

If the stack module 405 determines 535 that the stack size is within the buffer threshold of the maximum threshold, the stack module 405 selects 540 a context 205. The stack module 405 may select 540 the context 205 that has the largest memory use of the plurality of contexts 205 in the stack 210. Alternatively, the stack module 405 may select 540 the contexts 205 that is the earliest created context 205 of the plurality of contexts 205 in the stack 210. In a certain embodiment, the stack module 405 selects 540 the context 205 that is the least recently used of the plurality of contexts 205 of the stack 210. The stack module 405 may also select 540 the context 205 pointed to by the stack pointer. Alternatively, the stack module 405 may select 540 a context 205 from the stack 210 at random.

The stack module 405 determines 545 if the selected context 205 satisfies the stack policy 430. If the stack module 405 determines 545 that the selected context 205 does not satisfy the stack policy 430, the stack module 405 may select 540 another context 205.

If the stack module 405 determines 545 that the selected context 205 satisfies the stack policy, the stack module 405 deallocates 550 the selected context 205. In one embodiment, the stack module 405 deallocates 550 to a selected context 205 by deallocating memory space of the context 205. In addition, the stack module 405 may write a pointer to the selected context's succeeding data structure as the selected context's preceding data structure's succeeding data structure. Similarly the stack module 405 may write a pointer to the selected context's preceding data structure as the selected context's succeeding data structure's preceding data structure.

In one embodiment, the stack module 405 determines 555 if a cleanup number of contexts 205 is deallocated. The cleanup number may be in the range of 5 to 30% of the stack size. Alternatively, the cleanup number may be in the range of 15 to 25% of the stack size. If the cleanup number of contexts 205 is not deallocated, the stack module 405 may select 540 another context 205. The stack module 405 may continue selecting 545 and deallocating 550 contexts 205 until the cleanup number of contexts 205 is deallocated. When the stack module 405 determines 555 that the cleanup number of contexts 205 is deallocated, the method 500 ends.

The method 500 maintains the stack 210 by deallocating 515 contexts 205 that satisfy the stack policy 430 when the stack size is within the buffer threshold of the maximum threshold. By deallocating 515 excess contexts 205, the method 500 reduces the overall DPS resources consumed by the stacks 210.

Figure 6:
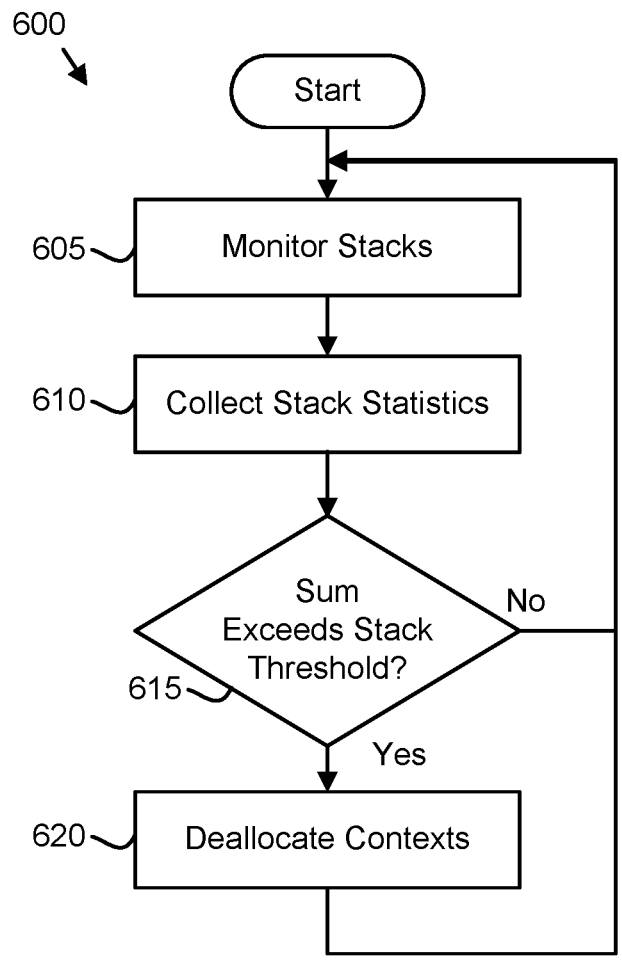
FIG. 6 is a schematic flow chart diagram illustrating one alternate embodiment of an stack maintenance method of the present invention.

FIG. 6 is a schematic flow chart diagram illustrating one alternate embodiment of a stack maintenance method 600 of the present invention. The method 600 substantially includes the steps to carry out the functions presented above with respect to the operation of the described apparatus 400 and system 100 of FIGS. 4 and 1 respectively. In one embodiment, the method 600 is implemented with a computer program product comprising a computer readable program stored on a tangible storage device. The computer readable program may be integrated into a computer, such as the storage controller 160, the server 130, and the client 110, wherein the program when executed on the computer performs the method 600.

The method 600 begins and in one embodiment, the monitor module 425 monitors 605 a plurality of stacks 210. The monitor module 425 may monitor stack size, frequency of use, and the like for each stack 210 of the plurality of stacks 210.

The monitor module 425 may also collect 610 statistics on each stack 210. In one embodiment, the monitor module 425 stores the stack size, frequency of use, and the like for each stack 210 after a specified time interval. The specified time interval may be in the range of 10 to 200 seconds. In a certain embodiment, the specified time interval is 30 seconds. In addition, the monitor module 425 may calculate statistics for the stack 210. For example, the monitor module 425 may calculate an average stack size, a mean that stack size, and the like for each stack 210.

In one embodiment, the stack module 205 determines 615 if the sum of contexts 205 on the plurality of stacks 210 exceeds a stack threshold. In one embodiment, the stack threshold is calculated using Equation 4, where $t_s$ is the stack threshold, c is a constant, $t_{maxi}$ the maximum threshold for the $i^{th}$ stack 210, and n is a number of stacks 210 in the plurality of stacks 210.

$$t_s = c \sum_{i=1}^{n} t_{maxi}$$ Equation 4

If the stack module 405 determines 615 that the sum of the contexts 205 on the plurality of stacks 210 does not exceed the stack threshold, the monitor module 425 may continue to monitor 605 the stacks 210. If the stack module 405 determines 615 that the sum of the contexts 205 on the plurality of stacks 210 exceeds the stack threshold, the stack module 405 deallocates 620 a reduction number contexts 205 from a least one stack 210.

In one embodiment, the stack module 405 deallocates 620 contexts 205 that satisfy the stack policy 430. The stack module 405 may deallocate 620 contexts 205 from each stack 210 of the plurality of stacks 210. Alternatively, contexts 205 may be deallocated 620 from each stack 210 in proportion to the maximum threshold of the stack 210.

After deallocating 620 contexts 205, the monitor module 425 may resume monitoring 605 the stacks 210. The method 600 manages a cumulative stack size of the plurality of stacks 210.

Figure 7:
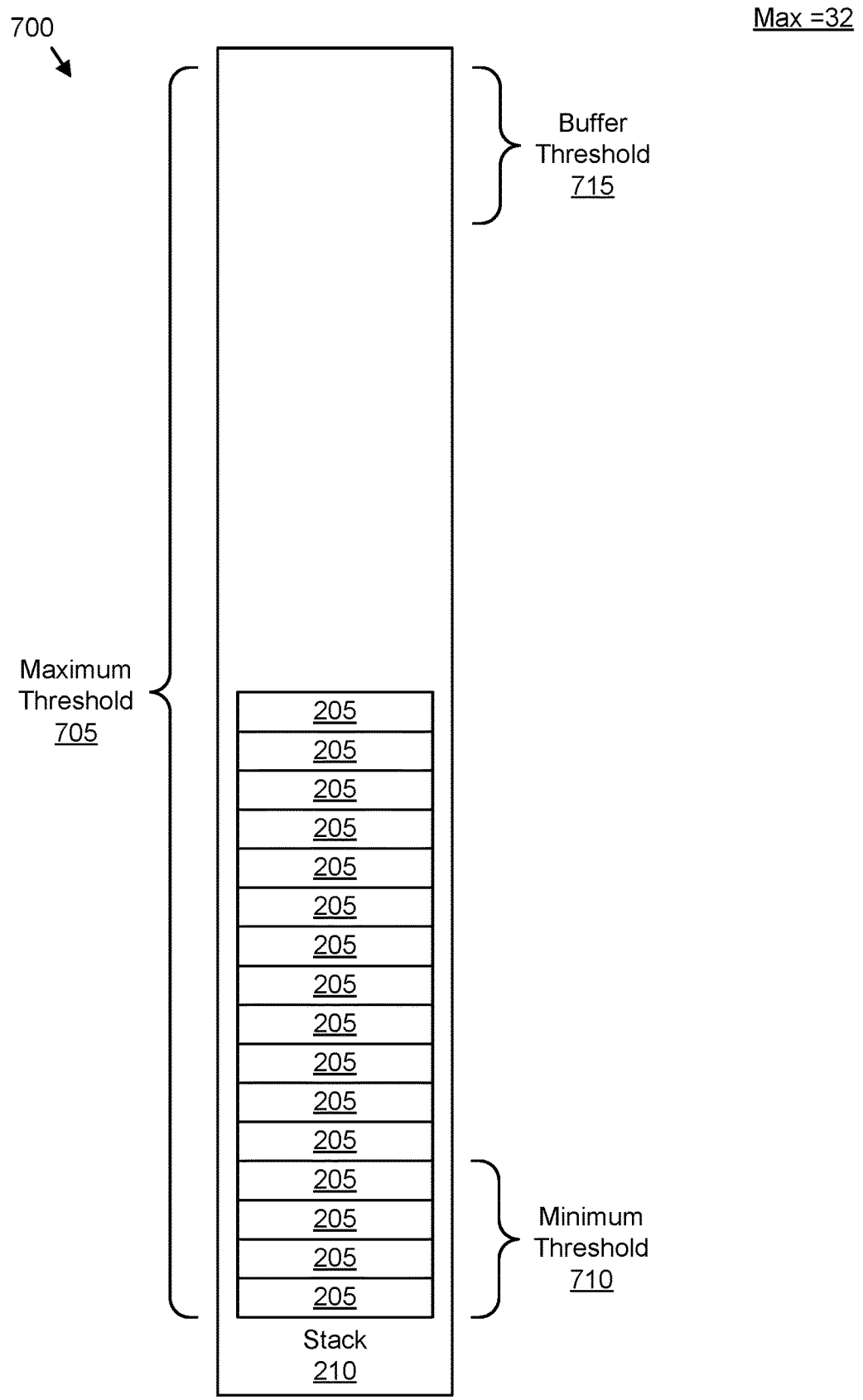
FIG. 7 is a schematic block diagram illustrating one embodiment of stack contexts of the present invention.
Figure 8:
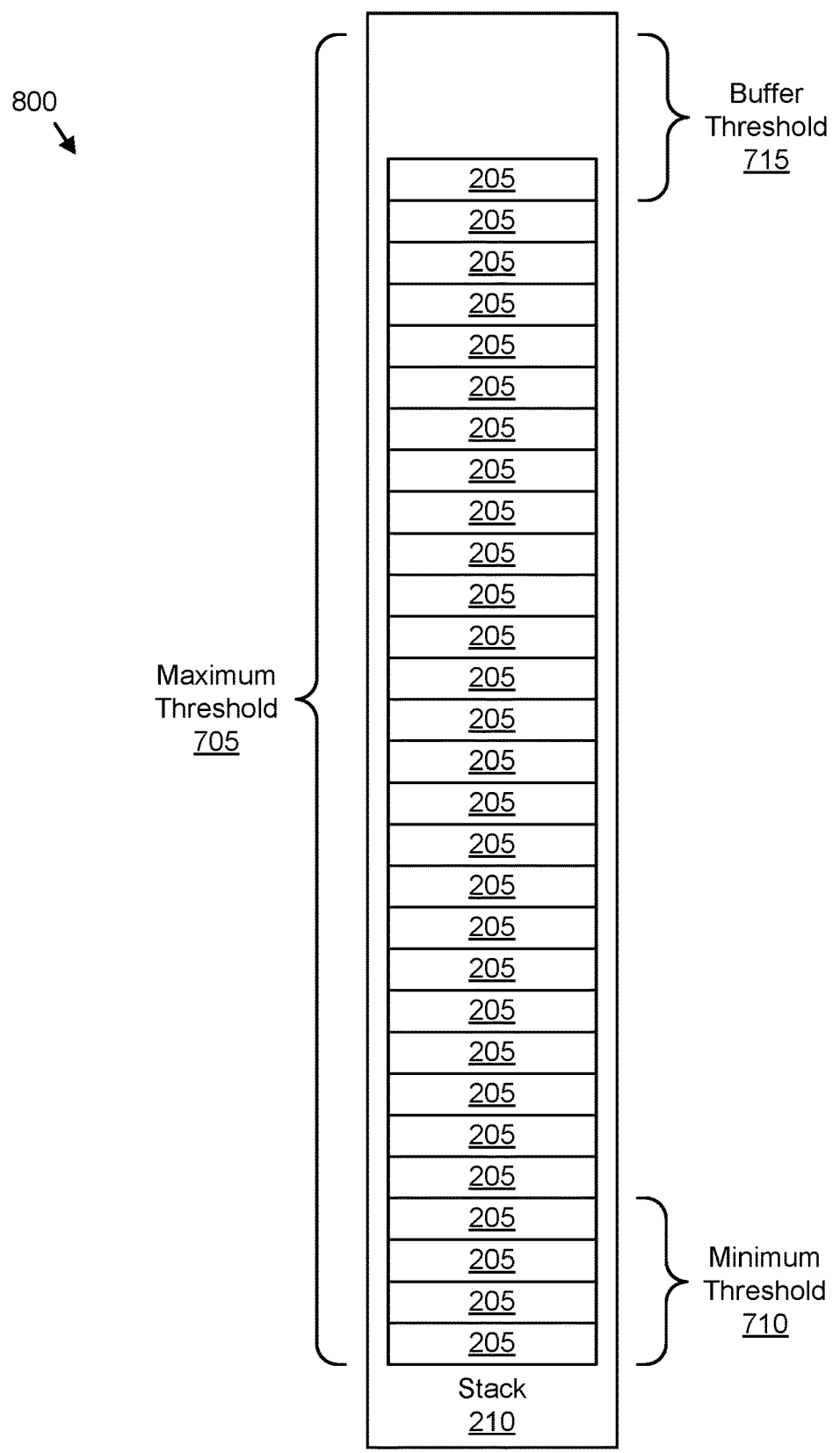
FIG. 8 is a schematic block diagram illustrating one alternate embodiment of stack contexts of the present invention.
Figure 9:
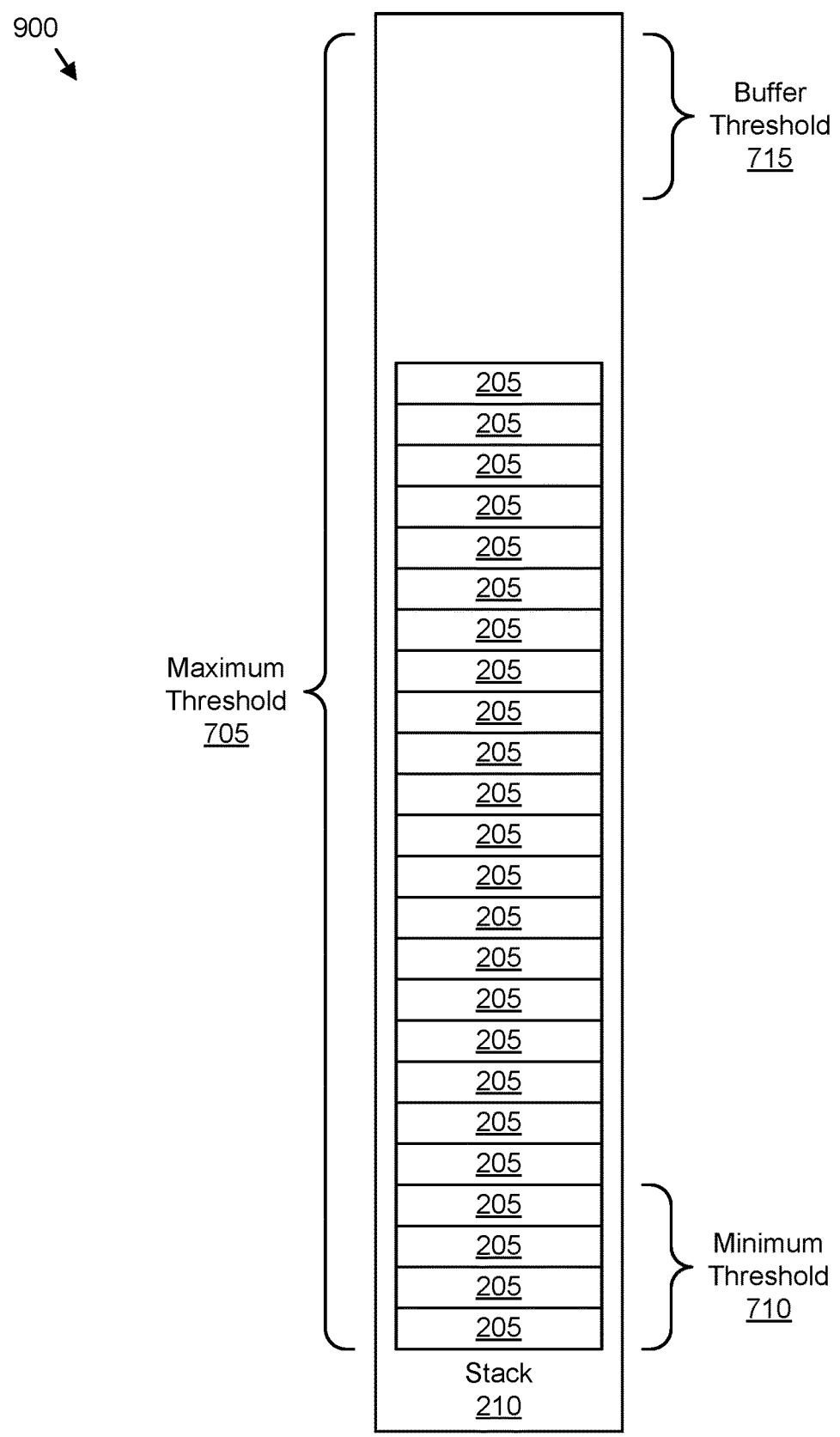
FIG. 9 is a schematic block diagram illustrating an additional embodiment of stack contexts of the present invention.

FIG. 7 is a schematic block diagram illustrating one embodiment of stack contexts 700 of the present invention. The description of the stack context 700 refers to elements of FIGS. 1-6, like numbers referring to like elements. The stack contexts 700 show a stack 210 with a plurality of contexts 205. The minimum threshold 710, maximum threshold 705, and threshold buffer 715 are also shown. FIGS. 7, 8 and 9 together illustrate maintaining the stack 210 using the method 500 of FIG. 5.

In the depicted embodiment, the stack size of the stack 210 exceeds the minimum threshold 710. In addition, the stack size of the stack 210 is not within the buffer threshold 715 of the maximum threshold 705. As a result, the stack module 405 does not determine 535 that the stack size is within the buffer threshold 715 of the maximum threshold 705.

FIG. 8 is a schematic block diagram illustrating one alternate embodiment of stack contexts 800 of the present invention. The stack contents 800 illustrate the stack 210 of FIG. 7. As depicted, additional contexts 205 have been returned to the stack 210 until the stack size is within the buffer threshold 715 of the maximum threshold 705. As a result, the stack module 405 determines 535 that the stack size is within the buffer threshold 715 of the maximum threshold 705.

FIG. 9 is a schematic block diagram illustrating an additional embodiment of stack contexts 900 of the present invention. The stack contents 900 illustrates the stack 210 of FIGS. 7 and 8. As depicted, the stack module 405 deallocated six contexts 205 from the stack 210 in response to the stack size being within the buffer threshold 715 of the maximum threshold 705. In the depicted embodiment, six is the cleanup number of contexts 205.

The present invention maintains a context stack 210 by monitoring 539 a stack size and deallocating 550 a selected context that satisfies the stack policy 430 when the stack size is within the buffer threshold 715 of the maximum threshold 705. By maintaining the stack 210, the present invention prevents the stack 210 from consuming excessive DPS resources. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for maintaining a context stack, the computer program product comprising a storage device having a computer readable program embodied therewith, the computer readable program readable/executable by a processor to cause the processor to:

monitor a stack size for a stack of a plurality of existing contexts that are not associated to a process of a plurality of processes, wherein each context is associable and reusable with a plurality of processes and comprises a pathway to a data set when not associated to any process of the plurality of processes, the pathway comprising a logical volume identifier for the data set, a logical address of the data set within the logical volume, and a logical address of an intervening device, wherein the context defines communications between the process and the data set through the pathway when associated to the process, and each context is returned to the stack when not associated to the process; and deallocate a context that satisfies a stack policy from the stack if the stack size is within a buffer threshold of a maximum threshold.

2. The computer program product of claim 1, wherein the computer readable program further causes the processor to deallocate a cleanup number of contexts from the stack if the stack size is within the buffer threshold of the maximum threshold.

3. The computer program product of claim 2, wherein the cleanup number is in the range of fifteen to twenty-five percent of the maximum threshold.

4. The computer program product of claim 1, wherein the context satisfies the stack policy if a retention interval is expired after a creation of the context.

5. The computer program product of claim 4, wherein the retention interval is in the range of one hundred to five hundred seconds.

6. The computer program product of claim 1, wherein the context satisfies the stack policy if the context has a largest memory use of the plurality of contexts.

7. The computer program product of claim 1, wherein the context satisfies the stack policy if the context is the earliest created context of the plurality of contexts.

8. The computer program product of claim 1, wherein the context satisfies the stack policy if the context is a least recently used context of the plurality of contexts.

9. The computer program product of claim 1, wherein the computer readable program further causes the processor to monitor a plurality of stacks and deallocate a reduction number of contexts from at least one stack if a sum of contexts on the plurality of stacks exceeds a stack threshold.

10. The computer program product of claim 1, wherein the computer readable program further causes the processor to collect statistics on the stack.

11. The computer program product of claim 10, wherein the computer readable program further causes the processor to monitor the stack size with a stack statistic thread that is inactive for the monitor interval, activate after the monitor interval, determine the stack size, and return to inactivity.

12. The computer program product of claim 1, wherein the buffer threshold is in the range of five to fifteen percent of the maximum threshold.

13. The computer program product of claim 1, wherein the monitor interval is in the range of one hundred to two hundred seconds.

14. The computer program product of claim 1, wherein the monitor interval m is calculated as m=(100)k/v where k is a constant and v is a volume of transactions for the process.

15. The computer program product of claim 1, wherein the computer readable program further causes the processor to calculate the maximum threshold $t_{max}$ for a first stack as $$t_{max} = \frac{pv_1}{\sum_{i=1}^{n} v_i}$$

where p is a constant, n is a number of the plurality of contexts, $v_1$ is a volume of transactions for the first process, and $v_i$ is a volume of transactions for each $i^{th}$ process of a plurality of processes.

16. The computer program product of claim 1, wherein the computer readable program further causes the processor to:
 establish the maximum threshold of contexts allocated to the stack;
 establish a minimum threshold wherein the stack has at least the minimum threshold of contexts; and
 establish the buffer threshold.

17. The computer program product of claim 16, wherein the minimum threshold is in the range of twenty-five to two hundred contexts and the maximum threshold is in the range of one thousand to five thousand contexts.

18. An apparatus comprising:
 a monitor module that monitors a stack size for a stack of a plurality of existing contexts that are not associated to a process of a plurality of processes, wherein each context is associable and reusable with a plurality of processes and comprises a pathway to a data set when not associated to any process of the plurality of processes, the pathway comprising a logical volume identifier for the data set, a logical address of the data set within the logical volume, and a logical address of an intervening device, wherein the context defines communications between the process and the data set through the pathway when associated to the process, and each context is returned to the stack when not associated to the process; and
 a stack module that deallocates a context that satisfies a stack policy from the stack if the stack size is within a buffer threshold of a maximum threshold,
 wherein at least a portion of the monitor module and the stack module comprise one or more of hardware and executable code, the executable code stored on one or more computer readable storage media.

19. The apparatus of claim 18, wherein the stack module further deallocates a cleanup number of contexts from the stack if the stack size is within the buffer threshold of the maximum threshold.

20. A system to maintain a context stack, the system comprising:
 a plurality of storage devices storing a data set;
 a plurality of contexts each defining communications between a process and the data set and comprising a pathway for communicating with the data set and a process identifier;
 a server in communication with the storage devices and comprising a stack of contexts;
 a monitor module that monitors a stack size for a stack of a plurality of existing contexts that are not associated to a process of a plurality of processes, wherein each context is associable and reusable with a plurality of processes and comprises a pathway to a data set when not associated to any process of the plurality of processes, the pathway comprising a logical volume identifier for the data set, a logical address of the data set within the logical volume, and a logical address of an intervening device, wherein the context defines communications between the process and the data set through the pathway when associated to the process, and each context is returned to the stack when not associated to the process; and
 a stack module that deallocates a context that satisfies a stack policy from the stack if the stack size is within a buffer threshold of a maximum threshold,
 wherein at least a portion of the monitor module and the stack module comprise one or more of hardware and executable code, the executable code stored on one or more computer readable storage media.

* * * * *